(12) United States Patent
Yang

(10) Patent No.: US 8,465,029 B2
(45) Date of Patent: Jun. 18, 2013

(54) FOLDABLE HANDCART

(75) Inventor: Cheng-Chiang Yang, Taichung (TW)

(73) Assignee: Great Taiwan Material Handling Co., Taichung (TW)

( * ) Notice: Subject to any disclaimer, the term of this patent is extended or adjusted under 35 U.S.C. 154(b) by 159 days.

(21) Appl. No.: 13/217,262

(22) Filed: Aug. 25, 2011

(65) Prior Publication Data
US 2013/0049333 A1 Feb. 28, 2013

(51) Int. Cl.
*B62B 1/00* (2006.01)
*B62B 3/00* (2006.01)

(52) U.S. Cl.
USPC ........................................ 280/47.27; 280/652

(58) Field of Classification Search
USPC ........... 280/652, 47.27, 47.131, 47.17, 47.18, 280/47.24, 47.26, 651, 655, 638, 639, 35
See application file for complete search history.

(56) References Cited

U.S. PATENT DOCUMENTS

| | | | | |
|---|---|---|---|---|
| 4,993,727 A | * | 2/1991 | vom Braucke et al. | 280/40 |
| 5,803,471 A | * | 9/1998 | DeMars et al. | 280/40 |
| 5,941,543 A | * | 8/1999 | Kazmark, Jr. | 280/47.29 |
| RE38,436 E | * | 2/2004 | Su | 280/40 |
| 7,044,484 B2 | * | 5/2006 | Wang | 280/47.27 |
| 7,097,183 B1 | * | 8/2006 | Su | 280/47.29 |
| 7,387,306 B2 | * | 6/2008 | Zimmer | 280/47.29 |
| 7,398,990 B2 | * | 7/2008 | Tsai | 280/652 |
| 7,441,785 B1 | * | 10/2008 | Tsai | 280/639 |
| 7,614,628 B2 | * | 11/2009 | O'Connor | 280/652 |
| D664,733 S | * | 7/2012 | Yang | D34/24 |
| D677,034 S | * | 2/2013 | Chang et al. | D34/24 |
| 2002/0180184 A1 | * | 12/2002 | Chang | 280/652 |

* cited by examiner

*Primary Examiner* — J. Allen Shriver, II
*Assistant Examiner* — James M Dolak

(57) ABSTRACT

A foldable handcart includes a handle, a cart frame, a carrier board, two wheel seats and two wheels. Two frame seats are deposited on the carrier board for pivoting the carrier board on the cart frame. A front side and a top side are defined on the frame seat. A corner formed by the front side and the top side is a round corner. Therefore when the foldable handcart is not in use, a user presses down the foldable handcart and the wheel seats contact with the corners to rotate the carrier board up slightly according to the lever principle. The user further folds the foldable handcart easily. Furthermore, the carrier board is completely escaping the ground when the foldable handcart is folded.

4 Claims, 8 Drawing Sheets

FOLDABLE HANDCART

BACKGROUND OF THE INVENTION

1. Field of the Invention

The present invention relates to a handcart, more particularly to a foldable handcart.

2. Description of Related Art

Referring to FIGS. 1-3, a conventional handcart comprises a handle 1 which is formed by bending a pipe to a U-shape, a cart frame 2 which is formed by assembling the handle 1 to a pair of parallel pipes. Two connecting members 3 are attached to the two sides of the bottom of the cart frame 2. The connecting member 3 is received into a tube 5 of a wheel seat 6. A first gearwheel 9 is deposited at the bottom of the tube 5. A carrier board 4 is connected to the bottom of the two connecting members 3. Two second gearwheels 10 are deposited at left and right sides of the carrier board 4 respectively. The first gearwheel 9 engages with the second gearwheel 10 orthogonally. The two wheel seats 6 are connected to the left and right sides of the rear portion of the carrier board 4. Each of the wheel seats 6 has a wheel space 7 respectively for connecting to a wheel 8. When the conventional handcart is not in use, the carrier board 4 is bent up and close to the cart frame 2. In addition, the wheels 8 are aligned to be parallel with the cart frame 2 by an interaction between the first gear wheel 9 and the second gear wheel 10. Therefore, the conventional handcart only occupies a small space in a storeroom. When the conventional handcart is in use, the carrier board 4 is bent to the ground so that a user can carry things from one place to another by the conventional handcart.

However, the conventional handcart has two shortcomings as following:

First, when the conventional handcart is folded, some portions of the carrier board 4 still contact to the ground to produce a friction so that the user cannot easily move the folded handcart to the storeroom.

Second, the user needs to spend a lot of energy bending the carrier board 4 up because the interaction between the first gearwheel 9 and the second gearwheel 10.

The present invention has arisen to mitigate and/or obviate the disadvantages of the conventional.

SUMMARY OF THE INVENTION

The main objective of the present invention is to provide an improved foldable handcart.

To achieve the objective, a foldable handcart comprises a cart frame, a handle, two cylindrical tubes deposited at the left and right sides of the bottom of the cart frame respectively, two plastic shields encircling the two cylindrical tubes for protection, an engaging ring deposited on the bottom of each of the plastic shields and encircling each of the cylindrical tubes, a wheel pivoted on one side of a wheel seat, a receiving tube deposited at another side of the wheel seat, the receiving tube enclosing the cylindrical tube for connecting the cart frame and the wheel seat, a second engaging portion deposited on the top of the receiving tube and matching with the first engaging portion of the engaging ring, a spring being set between the engaging ring and the receiving tube, one end of the spring connected to the cylindrical tube, another end of the spring connected to the receiving tube, two frame seats deposited on the left and right sides of a carrier board respectively for connecting the carrier board to the cart frame, each of the frame seats having a through hole defined thereon for pivoting the carrier board on the cart frame by bolts, a front side and a top side defined on the frame seat constructing a corner, each of the corners between the front side and the top side formed as a round corner;

wherein the carrier board is completely escaping from the ground when the foldable handcart is folded, such that the foldable handcart is easily to move by rolling the wheels; one distance from the front side of the frame seat to the through hole is smaller than another distance from the top side of the frame seat to the through hole; the handle is U-shape; the plastic shield and the wheel seat are made of plastics.

Further benefits and advantages of the present invention will become apparent after a careful reading of the detailed description with appropriate reference to the accompanying drawings.

DETAILED DESCRIPTION OF THE INVENTION

Figure 1:
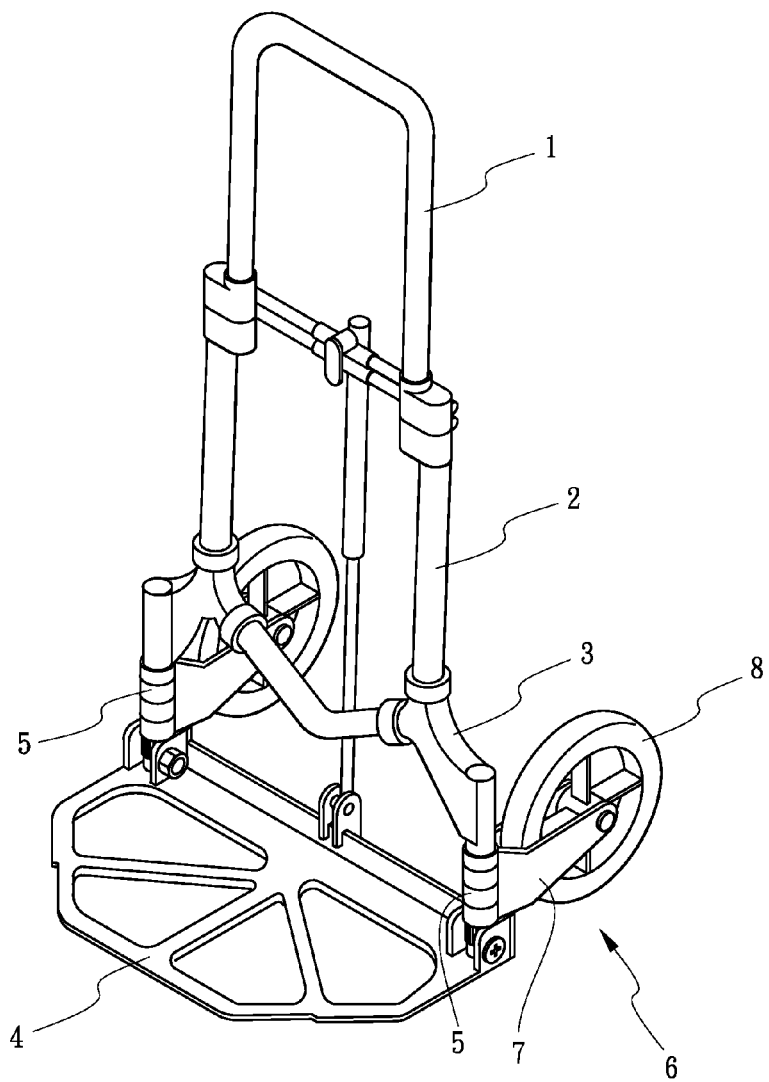
FIG. 1 is a perspective view of a prior art.
Figure 2:
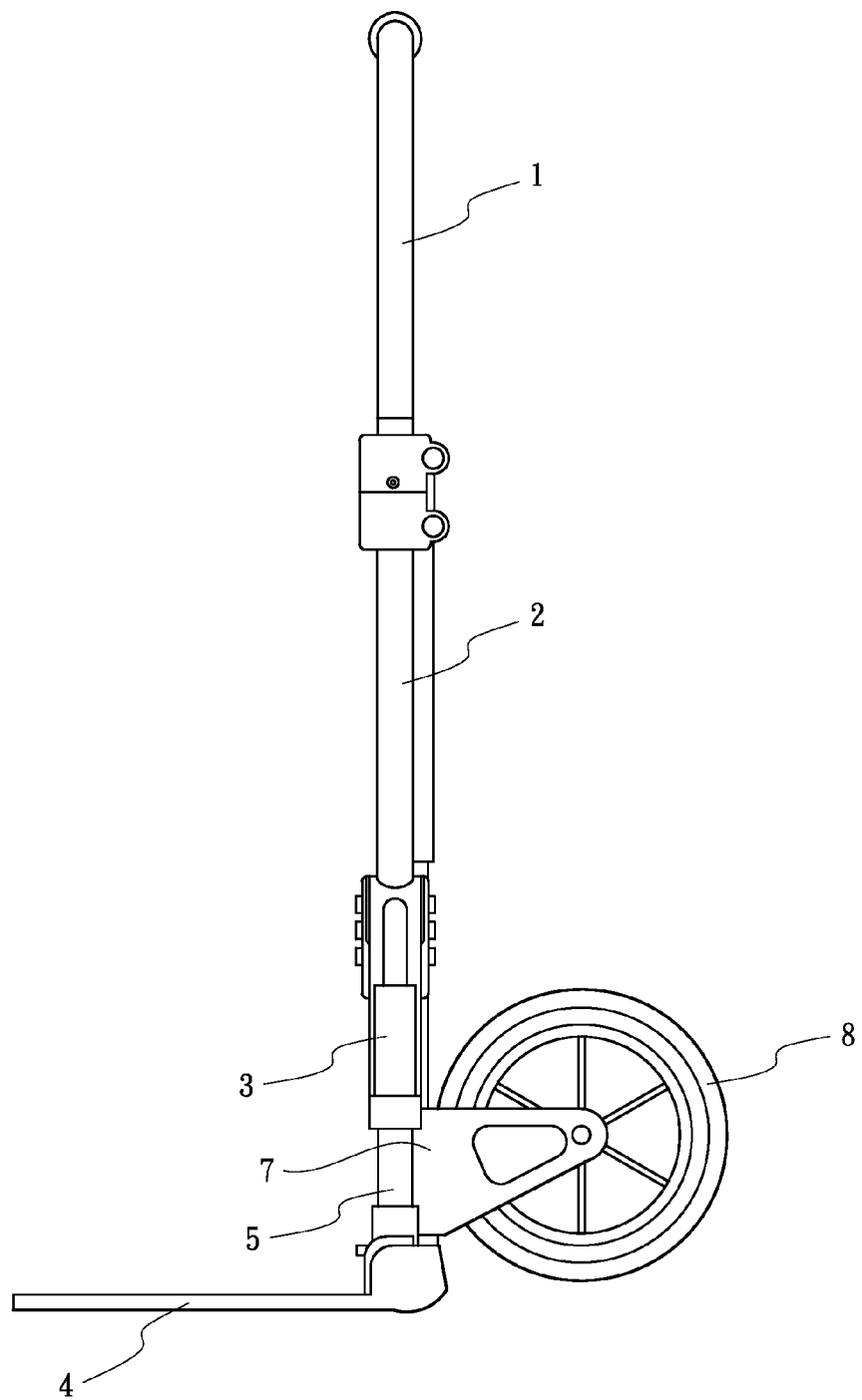
FIG. 2 is a right side view of the prior art.
Figure 3:
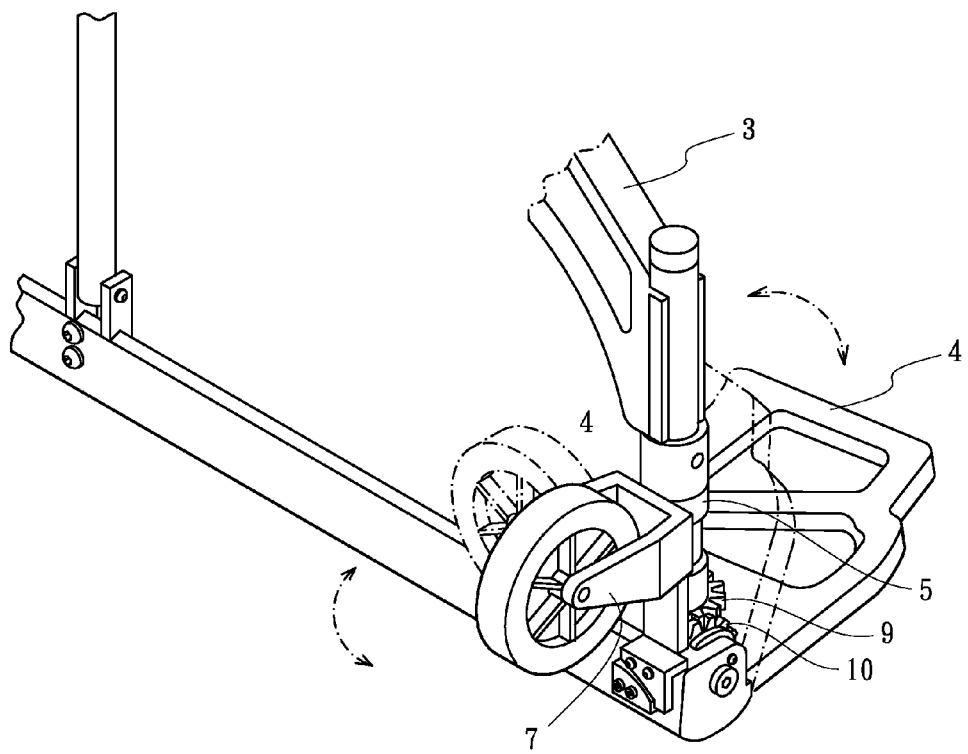
FIG. 3 is a partially enlarged view of the prior art for showing a wheel seat aligned to be parallel with a cart flame by bending a carrier board up.
Figure 4:
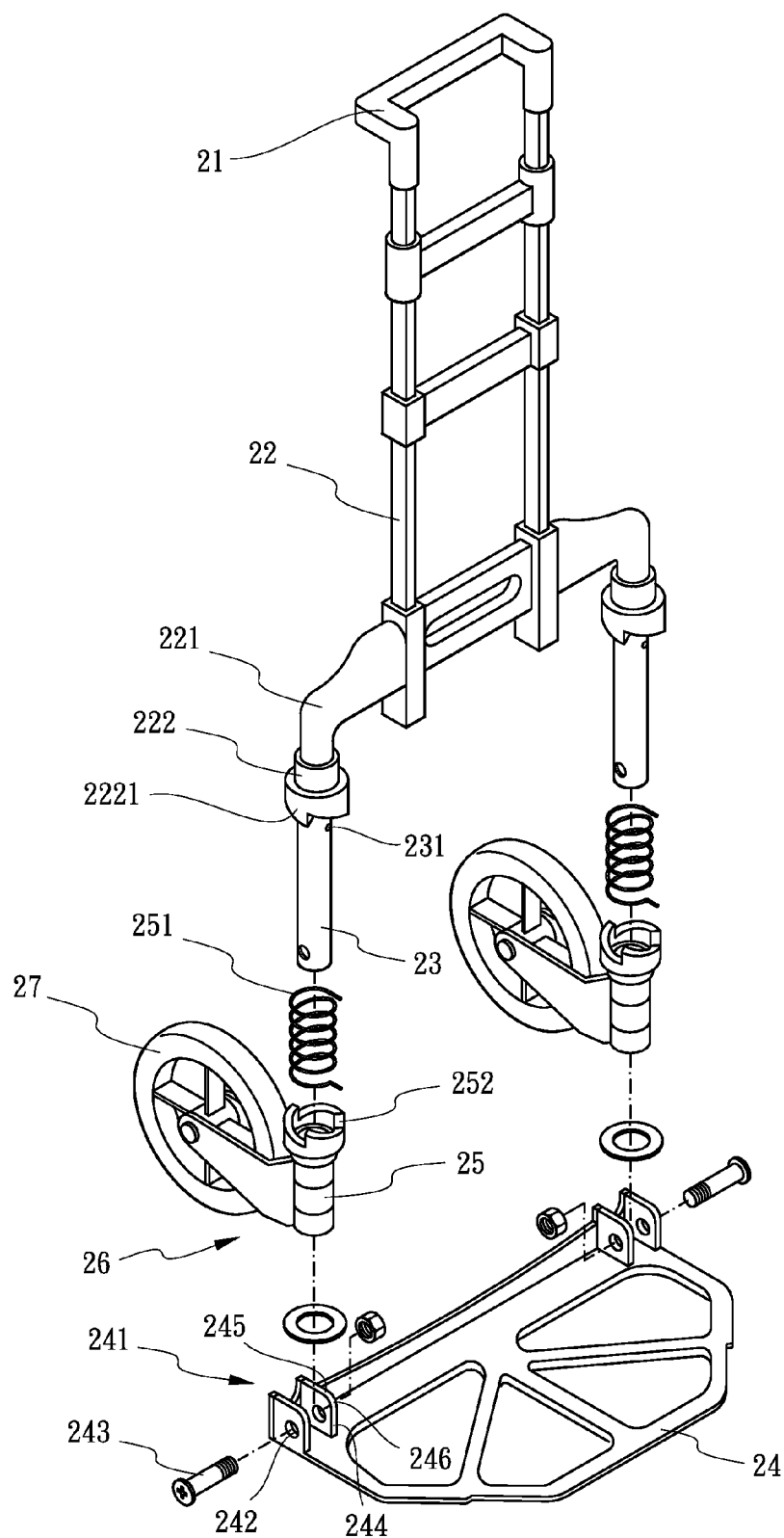
FIG. 4 is an exploded view of a foldable handcart of the present invention.
Figure 5:
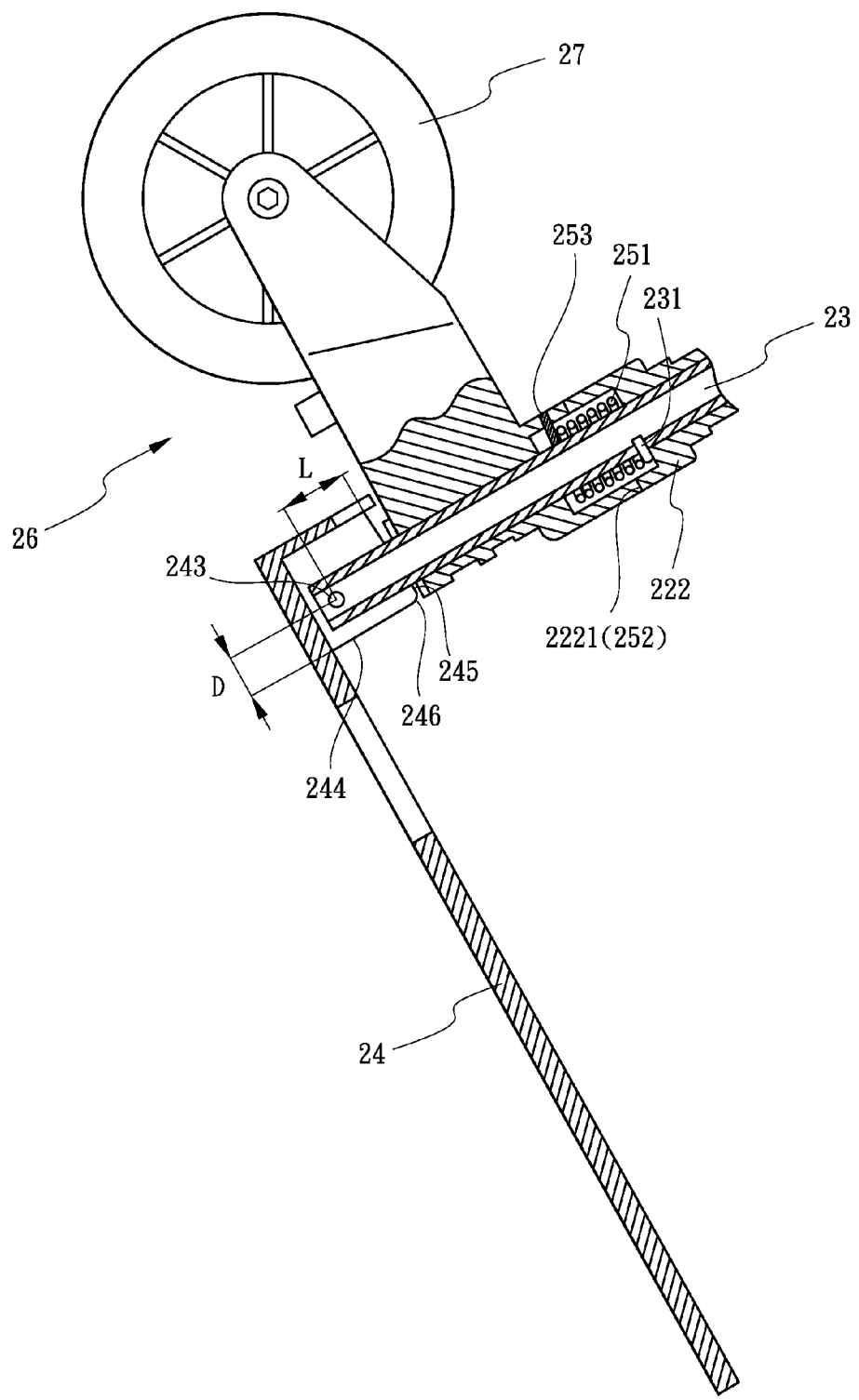
FIG. 5 is a partially enlarged view of the foldable handcart for showing the relation between a carrier board and a wheel seat when the foldable handcart is in use.

Referring to the drawings and initially to FIG. 4-8, a foldable handcart in accordance with the present invention comprises a cart frame 22 which is constructed by a pair of parallel pipes, a handle 21 which is U-shape. The handle 21 is assembled to the top of the cart frame 22 for a user to grip. Two cylindrical tubes 23 are deposited at the left and right sides of the bottom of the cart frame 22 respectively. Two plastic shields 221 encircle the two cylindrical tubes 23 for protection. An engaging ring 222 is deposited on the bottom of each of the plastic shields 221 and encircles each of the cylindrical tubes 23. A first engaging portion 2221 is deposited on the bottom of the engaging ring 222. A wheel 27 is pivoted on one side of a wheel seat 26 which is made of plastics. A receiving tube 25 is deposited at another side of the wheel seat 26. The receiving tube 25 encloses the cylindrical tube 23 for connecting the cart frame 22 and the wheel seat 27. A second engaging portion 252 is deposited on the top of the receiving tube 25 and matching with the first engaging portion 2221 of the engaging ring 222. A spring 251 is set between the engaging ring 222 and the receiving tube 25. One end of the spring 251 is connected to a first hole 231 defined on the cylindrical tube 23. Another end of the spring 251 is connected to a second hole 253 defined on the receiving tube 25. Two frame seats 241 are deposited on the left and right sides of a carrier board 24 respectively for vertically connecting the carrier board 24 to the cart frame 22. Each of the frame seats 241 has a through hole 42 defined thereon for pivoting the carrier board 24 on the cart frame 22 by bolts 243. A distance D is from a front side 244 of the frame seat 241 to the through hole 242 as marked in FIG. 5. A distance L is from a top side 245 of the frame seat 241 to the through hole 242 as marked in FIG. 5. The distance D is smaller than the distance L. Each of corners 246 between the front side 244 and the top side 245 is formed as a round corner. Under this arrangement, when the foldable handcart is folded, the carrier board 24 is completely escaping from the ground such that the foldable handcart is easily to move into the storeroom by rolling the wheels 27 on the ground.

Figure 6:
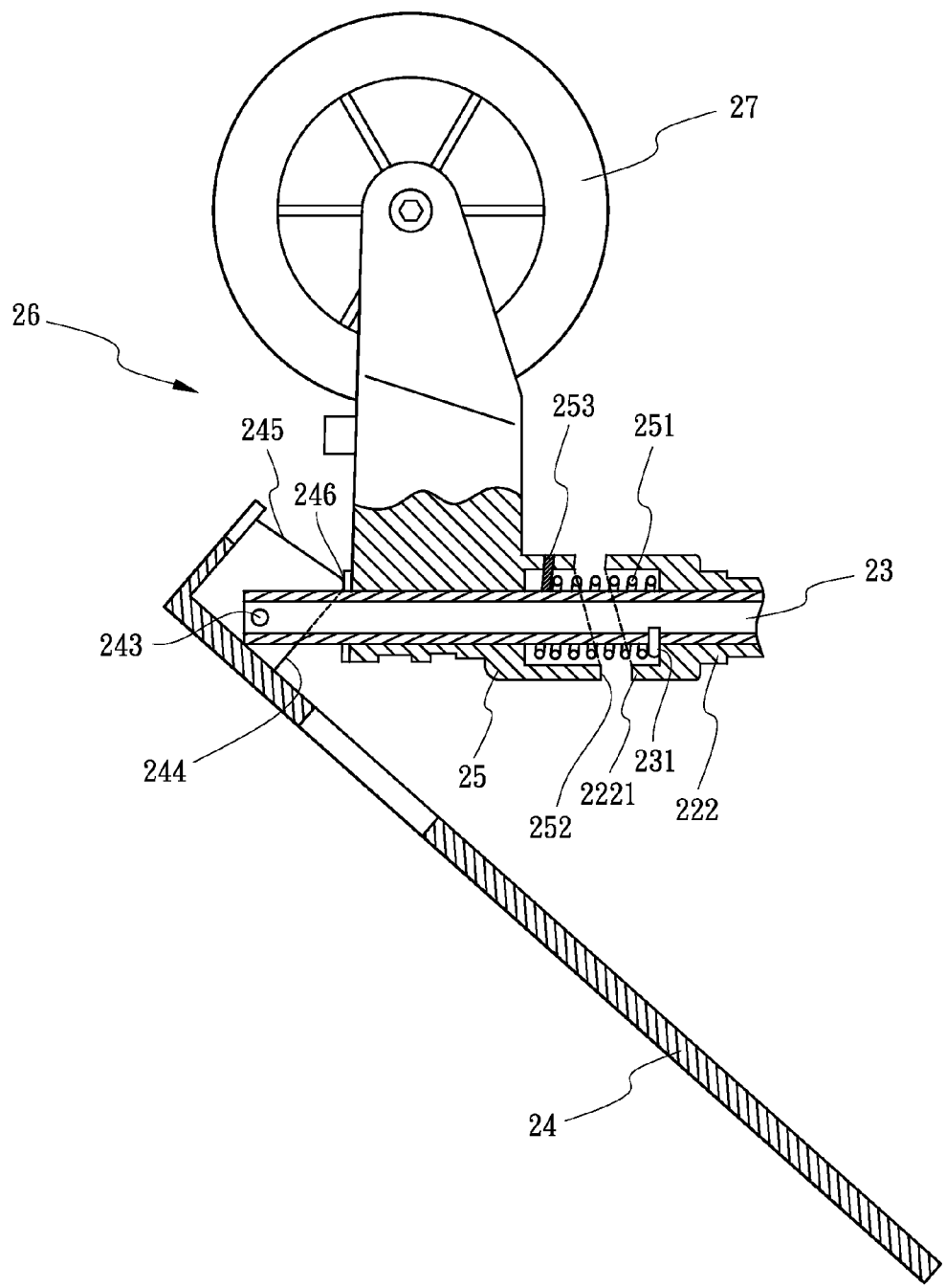
FIG. 6 is a partially enlarged view of the foldable handcart for showing the relation between a carrier board and a wheel seat when the foldable handcart is not in use.
Figure 7:
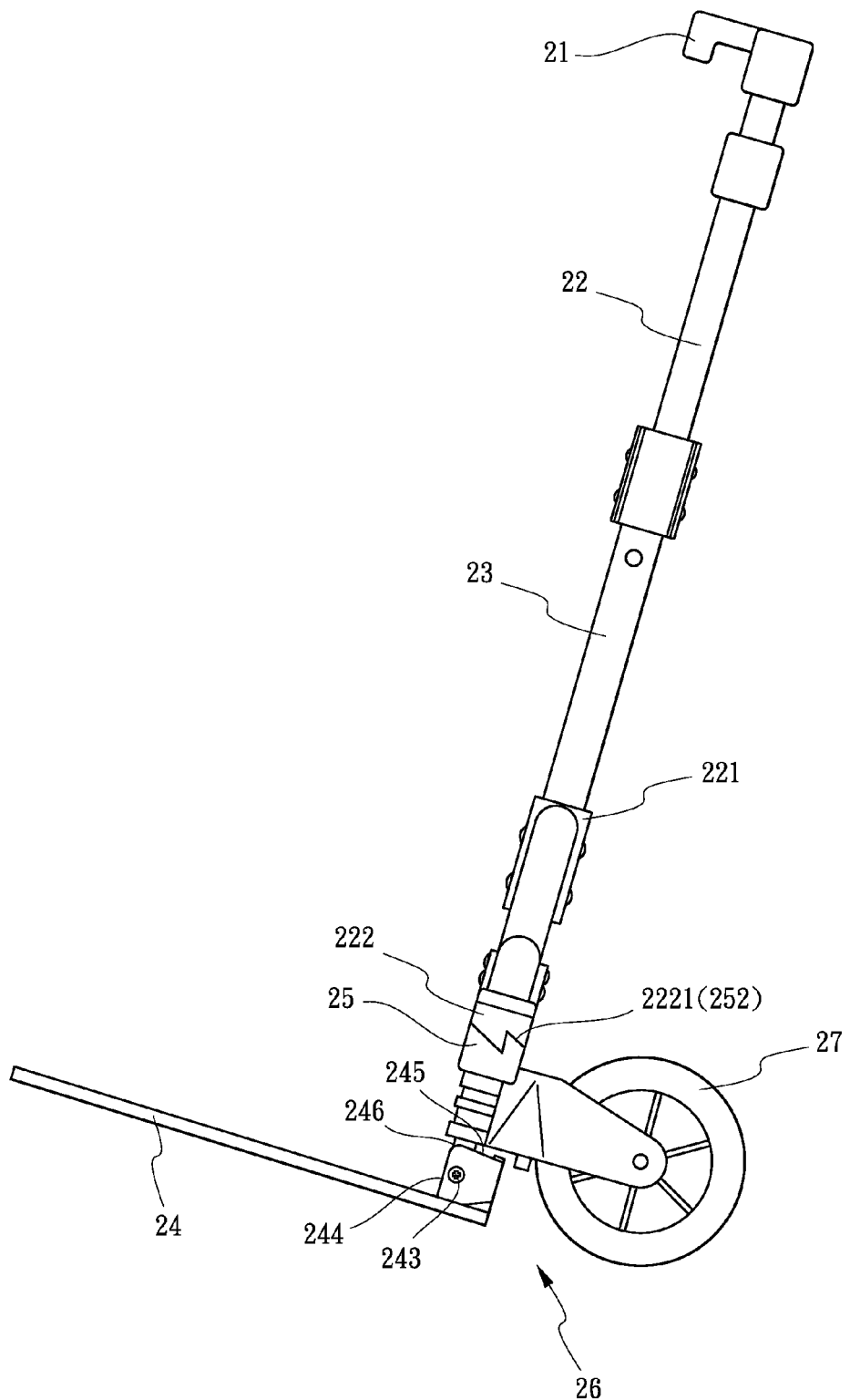
FIG. 7 is a right side view of the foldable handcart for showing the foldable cart in use.
Figure 8:
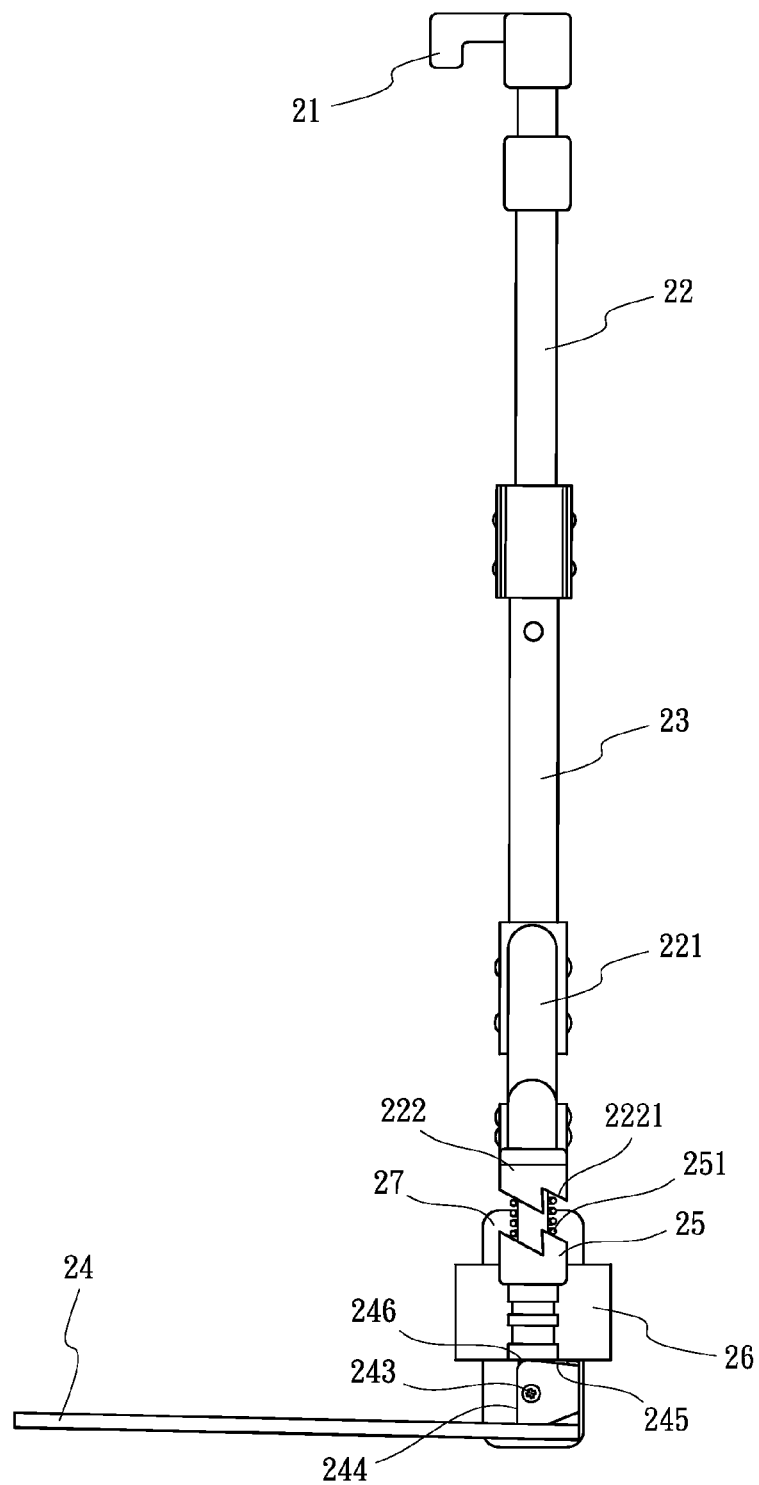
FIG. 8 is a right side view of the foldable handcart for showing the foldable cart not in use.

Referring to the FIG. 7, when the foldable handcart is in use, the carrier board 24 is bent down and vertical to the cart frame 22. The first engaging portions 2221 are tightly engaged with the second engaging portions 252. In contrast, when the foldable handcart is not in use, the user presses down the handle 21 to disengage the first engaging portions 2221 from the second engaging portions 252 as shown in FIGS. 6 and 8. Thereafter, the user rotates two wheel seats 26 to face each other within the cart frame 22. Finally, the user releases the handle 21, thereby the recovery force from the spring 251 pulls the wheel seats 26 up and positioning the wheel seats 26 from freely rotating around the cart frame 22. The carrier board 24 can be bent up for decreasing the size of the foldable handcart. Further referring to FIG. 6, when the user presses down the handle 21 to fold the foldable handcart, the wheel seat 26 contacts with the corners 246 of the frame seats 241 such that the carrier board 24 is rotated up slightly around the corners 246 according to the lever principle. Therefore, the user can more easily bend the carrier board 24 up for folding the foldable handcart.

Although the invention has been explained in relation to its preferred embodiment, it is to be understood that many other possible modifications and variations can be made without departing from the spirit and scope of the invention as hereinafter claimed.

What is claimed is:

1. A foldable handcart comprising:
   a cart frame, a handle, two cylindrical tubes deposited at the left and right sides of the bottom of the cart frame respectively, two plastic shields encircling the two cylindrical tubes for protection, an engaging ring deposited on the bottom of each of the plastic shields and encircling each of the cylindrical tubes, a wheel pivoted on one side of a wheel seat, a receiving tube deposited at another side of the wheel seat, the receiving tube enclosing the cylindrical tube for connecting the cart frame and the wheel seat, a second engaging portion deposited on the top of the receiving tube and matching with the first engaging portion of the engaging ring, a spring being set between the engaging ring and the receiving tube, one end of the spring connected to the cylindrical tube, another end of the spring connected to the receiving tube, two frame seats deposited on the left and right sides of a carrier board respectively for connecting the carrier board to the cart frame, each of the frame seats having a through hole defined thereon for pivoting the carrier board on the cart frame by bolts, a front side and a top side defined on the frame seat constructing a corner, each of the corners between the front side and the top side formed as a round corner;
   wherein the carrier board is completely escaping from the ground when the foldable handcart is folded, such that the foldable handcart is easily to move by rolling the wheels on the ground.

2. The foldable handcart as claimed in claim 1, wherein one distance from the front side of the frame seat to the through hole is smaller than another distance from the top side of the frame seat to the through hole.

3. The foldable handcart as claimed in claim 1, wherein the handle is U-shape.

4. The foldable handcart as claimed in claim 1, wherein the plastic shield and the wheel seat are made of plastics.

* * * * *